Feb. 7, 1967 F. R. HAYS 3,303,110

METHOD OF SEALING FIBER OPTIC PLATES

Filed Nov. 13, 1963

INVENTOR
FREDERICK R. HAYS

BY *J. Albert Hultquist*

ATTORNEY 3,303,110
METHOD OF SEALING FIBER OPTIC PLATES
Frederick R. Hays, Woodstock, Conn., assignor to American Optical Company, Southbridge, Mass., a voluntary association of Massachusetts
Filed Nov. 13, 1963, Ser. No. 323,333
12 Claims. (Cl. 204—16)

This invention relates to plate structures having energy-receiving and emitting opposite end faces and formed of a multiplicity of fused fiber elements extending from one face toward the other. The invention has particular reference to a novel and improved method of hermetically sealing porosities in such structures.

Fiber plates are used in energy-converting devices to conduct light or other forms of energy from one compartment to another in the device or, as in the case of the cathode ray tube, to conduct such energy through and to the exterior of an evacuated tube envelope. In the cathode ray tube application, for example, the face plate must be capable of sustaining the usual vacuum provided within the tube envelope throughout the expected life of the tube.

Fiber face plates are formed by bundling a number of individual fiber elements together in mosaic fashion and heating the array thereof to fusing temperature. During fusion, compressing forces are usually applied laterally to the array of fiber elements to close and seal as many voids therebetween as possible. However, in view of the fact that most fiber plates are made up of thousands of very fine fiber elements, it is difficult to obtain a truly hermetic seal between each and every fiber at the time the face plate is fabricated. Where such seal is not attained the resultant face plate structure is permeable to gases when subjected to pressure or the pull of a vacuum developed within the tube into which it is sealed. Accordingly, in such condition they are unsuitable for use in devices such as cathode ray tubes or the like.

Heretofore numerous attempts have been made to overcome this problem usually by way of variations in techniques used to fabricate the plates rather than with attempts to remedy those rejected only because of their permeable nature.

Techniques of fabrication which turn to the use of exceptionally high temperatures and pressures in the order of those required to assure a complete vacuum seal between all fiber elements of a face plate structure may cause the fiber elements to become overheated and seriously distorted. Though a vacuum tight plate can be thus produced it is usually at the cost of a degradation of the optical or energy-transmitting characteristics of the plate.

In instances where it has been attempted to seal permeable fiber plates with blanket coatings of relatively low melting temperature glass or the like applied to the energy-receiving and/or emitting faces thereof, the resultant coatings have been found to be adverse to the energy-transmitting properties of the fibers. Furthermore, such coatings are difficult and costly to apply.

The present invention relates more particularly to a process which, as a follow-up to any or all processes used to form fiber plates, can be used to seal interstices, crevices, fissures and other such porosities in the plates to render them vacuum tight and suitable for use in evacuated electron tubes or the like.

Accordingly, an object of the present invention is to provide for the sealing of porous fiber plate structures in a simple, inexpensive and reliable manner; and to provide for the hermetic sealing of interstices, crevices, fissures and other such porosities in fiber plate structures without adversely affecting the energy receiving or emitting properties of respective fibers in the plate structures.

Another object is to accomplish the foregoing by providing a sealing medium internally of such porosities in fiber plate structures and to cause said medium to be formed in situ.

A further object is to provide for the sealing of porosities in a fiber plate with a precipitate deposited internally of the porosities; and to provide for the formation of the precipitate by interaction of ions and/or other electrified particles caused to enter into and join within the porosities.

Still another object is to provide for the formation of a precipitate having relatively high dielectric properties in interstices, fissures or other such voids in a fiber plate.

To attain the aforesaid objects and others which may appear from the following detailed description, in accordance with the principles of the present invention, I position a porous plate structure to be sealed as a partition between two compartments of a two part electrolytic cell. An electrolyte in aqueous solution such as a soluble metal salt or preselected combination of salts is placed in one compartment of the cell and in contact with one face of the plate. In the other compartment, another preselected electrolyte in aqueous solution or a medium in colloidal suspension is caused to adjoin the opposite side of the plate. Electrodes in series connected relationship with a source of direct electric current are placed one in each compartment of the electrolytic cell to provide the cell's anode and cathode.

In accordance with one aspect of the present invention, electrolytes in aqueous solution are placed in both compartments of the cell. The electrical potential applied between the cell's anode and cathode influences respective anions and cations of the electrolytes to migrate toward each other into porosities in the fiber plate. As the anions and cations come together in the porosities in the fiber plate, neutralization of the positive electrical charges on the cations by the negative electrical charges on the anions causes precipitation of the cations and anions as a compound in the porosities of the plate. An electrolyte having a constituent which, when electrolytically dissociated and precipitated, will form a seal in the fiber plate is placed in one compartment of the electrolytic cell and another electrolyte having a constituent which will interact with the first mentioned electrolyte to form the precipitate is placed in the other compartment of the cell. Electrodeposition of the precipitate forming the seal is continued until the build-up thereof in respective porosities is sufficient to render the plate vacuum tight.

The electrolytes are so selected that one does not form a chemical by-product such as an acid in which the precipitate of the other electrolyte is soluble. Also, they preferably are so selected as to form a precipitate which will not decompose when subjected to temperatures as high as 1100° Fahrenheit. The electrolytes may be metal salts so selected that their combined precipitates will form insoluble metal compounds or they may be compounds which will electrolytically dissociate and precipitate as glass forming salts such as borates, phosphates, silicates or combinations thereof which will vitrify at temperatures below the softening temperatures of the materials of the fiber plate. Precipitated glass forming salts, as such, can be utilized to hermetically seal the fiber plate or they can be subsequently vitrified to form a glass seal in the fiber plate.

In another aspect of the present invention, a silicate solution such as sodium silicate or potassium silicate having ionized silicate radicals which can be precipitated into an insoluble medium by neutralization with metal ions is placed in one compartment of the electrolytic cell. A metal salt such as barium acetate in aqueous solution is placed in the other compartment of the cell. Under the influence of the electric potential applied to the cell, the silicate radicals and metal ions are caused to migrate into porosities in the fiber plate toward each other where they meet and interact to become electrically neutralized and precipitated. The resultant precipitate of the metal ions and silicate radicals provides an insoluble silica and metal oxide residue which when deposited in sufficient quantity forms a hermetic seal in respective porosities in the fiber plate.

In still another aspect of the present invention, colloidal silica is suspended in one compartment of the electrolytic cell and caused to migrate into porosities in the fiber plate by influence of the electric field in the other compartment. The silica particles are precipitated in the porosities by influence of metal ions caused to enter the porosities and migrate toward the silica containing compartment. Precipitated silica and metal particles in sufficient quantity will plug the porosities to form a hermetic seal therein.

The present invention will be more fully understood by reference to the following detailed description which is accompanied by a drawing in which FIG. 1 illustrates in elevation and partly in section an electron tube having an energy-conducting face plate of the type relating more particularly to this invention;

Figure 1:
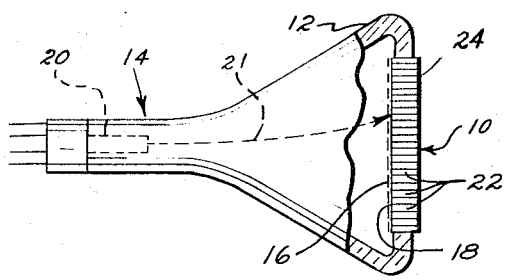

Referring now to FIG. 1, there is shown a fiber plate 10 which is illustrative of one type to which the sealing process of this invention is especially applicable. Plate 10, in this instance, is intended to receive and transfer light energy through the evacuated envelope 12 of cathode ray tube 14. To this end, a phosphor coating 16 is provided upon the image receiving face 18 of plate 10 so that electron gun 20 within the tube can direct an electron beam 21 onto phosphor coating 16 for exciting the same. A light image so formed on face 18 is received by fibers 22 which make up plate 10. As individual light guides, fibers 22 conduct a large part of the light image through plate 10 for reproduction thereof in mosaic form upon face 24 exteriorly of tube 14.

Figure 2:
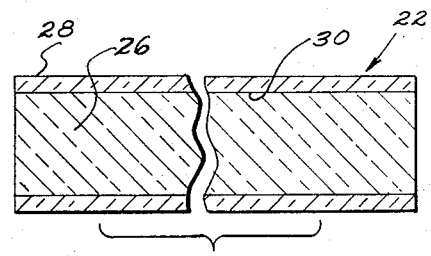
FIG. 2 illustrates in greatly enlarged form a longitudinal cross-section (broken away intermediate its ends) of one type of energy-conducting fiber useful in the fabrication of such face plates.

Fibers 22 are usually formed of optical glass or the like. As illustrated in FIG. 2, such fibers each embody a core 26 of material having a relatively high index of refraction surrounded by a relatively thin cladding 28 of material having a relatively low index of refraction. This construction provides a light-reflecting interface 30 between core 26 and cladding 28. Thus, light which enters one end of a particular fiber and which is incident upon interface 30 at an angle greater than the critical angle of reflection for the interface will be repeatedly reflected and conducted through the fiber to its opposite end according to the principles of total internal reflection. A typical fiber 22 might, for example, embody core 26 formed of optical flint glass having an index of refraction of approximately 1.75 and cladding 28 formed of crown or soda lime glass having an index of refraction of approximately 1.52. Other core and cladding glasses such as 1.81 index lanthanum flint and 1.48 index borosilicate glasses respectively can be used. Also, the fibers may be formed of special core glasses characterized to be predominantly transmissive to preselected regions of the spectrum and the cladding glasses may have controlled light absorbing and/or other special characteristics.

Fibers 22 may be either the single core type such as is illustrated in FIG. 2 or the multifiber type such as shown in Patent No. 2,992,516 assigned to the assignee of the present application. Multifibers each embody a plurality of energy-conducting cores surrounded by individual claddings all fused together.

For use in cathode ray tubes, fibers having core sizes of only a few microns in diameter are usually preferred. However, fibers ranging in size from approximately 3 microns in diameter to 100 microns or larger in diameter are useful. The smaller diameter fibers produce better resolution in transferring light images provided they are not so small in diameter as to approach the wavelength of light which is to be transferred thereby.

Figure 3:
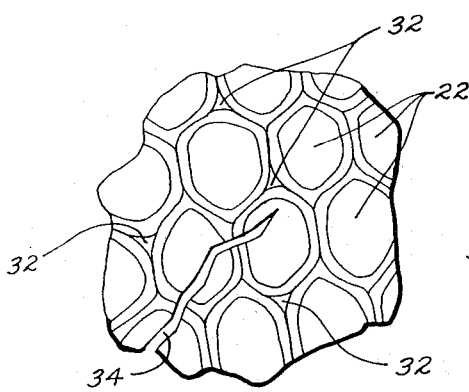
FIG. 3 is a greatly enlarged fragmentary plan view of the face plate illustrated in FIG. 1.

In forming the fused structure of fiber plate 10 a multiplicity of fibers are placed in side-by-side bundled relation with each other and heated to their fusing temperature. While heated, the bundle is compressed laterally to sequeeze the fibers into intimate interfitting relation with each other substantially as shown in FIG. 3. The respective fibers may be initially circular, square, hexagonal or of any other desired cross-sectional configuration. Circular fibers have been shown in FIG. 3 for purposes of illustration only.

Details of the various techniques which can be used to fabricate fiber plates will not be dealt with herein since the present invention relates to the treatment of any or all such plates which may have been formed to this point by whatever technique is used. It is only sufficient to point out that, under the best of conditions, fused fiber structures such as plate 10 will occasionally be found not to be vacuum tight. Accordingly, the present invention relates particularly to a process for rendering such porous fiber plates vacuum tight.

Figure 5:
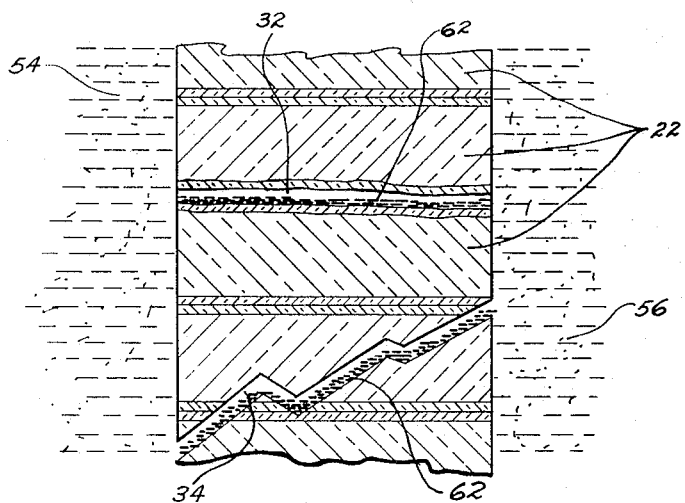
FIG. 5 is a greatly enlarged fragmentary cross-sectional view taken on line 5—5 of FIG. 4.

Porosities in fused fiber plates usually occur in the form of interstices 32 (see FIGS. 3 and 5) extending longitudinally between certain fibers which do not become completely closed at the time the fused fiber structure is fabricated. These interstices are usually minute and many times smaller in transverse dimension than the size of the fibers which make up the fiber plate so that they are not readily detectable by visual inspection. Nevertheless, under the pull of a vacuum equivalent to that which would be experienced by the plate if used in a cathode ray tube, for example, air or gases would tend to permeate through interstices however small they might be. Minute fissures 34 (see FIGS. 3 and 5) such as might result from strain or other causes occasionally occur during or following fabrication of a fiber plate. This type of porosity also contributes to the gas permeability of fused fiber plates. Fissure 34 or interstices 32 might not extend directly through the fiber plate as illustrated in FIGS. 3 and 5 but, instead, they might extend somewhat laterally into communication with one another to constitute a porosity extending through the fiber plate.

Most fabricating techniques are refined to the point where porosities such as mentioned above and others that might exist are not usually of a size which would be detrimental to the energy-conducting properties or physical strength of the fiber plate. That is, in transverse dimension, porosities such as 32 or 34 are usually in the order of only a few microns in transverse dimension and many times smaller than the transverse dimension of fibers 22 (see FIGS. 3 and 5). Nevertheless, the porosities do render the particular fiber plate permeable to gases and thus unsuitable for use in cathode ray tubes or other electron devices whose envelopes are evacuated or, for special application, might be pressurized.

In accordance with the principles of this invention, interstices, fissures and/or other voids or porosities in fused fiber plates are sealed in the following manner:

Following testing and determination that a fiber plate 10 is porous, it is placed as a partition between two compartments 36 and 38 of a two part electrolytic cell 40.

Figure 4:
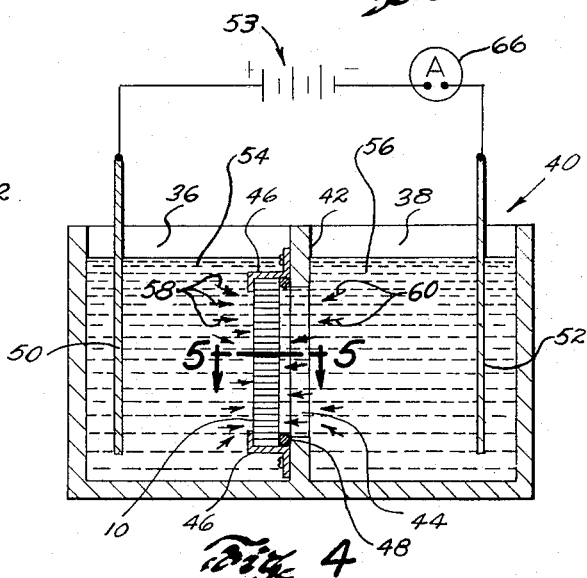
FIG. 4 illustrates means and method for practicing the process of the invention.

As shown in FIG. 4, compartments 36 and 38 are separated by wall 42 having opening 44 extending therethrough. Fiber plate 10 is positioned to span opening 44 and is fastened to one side of wall 42 with clamps 46. The adjoinment between plate 10 and wall 42 is rendered fluid-tight by gasket 48 to prevent interaction of respective fluid mediums placed in compartments 36 and 38 except by passage of preselected constituents of said mediums into porosities in the fiber plate as will be described presently.

Anode 50 and cathode 52 in series connected relationship with a source of direct electric current 53 are positioned in compartments 36 and 38 respectively to energize cell 40 when preselected fluid mediums 54 and 56 are placed in the compartments 36 and 38.

In accordance with one aspect of the present invention, a precipitate is formed in porosities 32 and 34 of plate 10 by placing an aqueous solution of an electrolyte in each of the compartments 36 and 38. Solution 54 in compartment 36 may, for example, embody the dissolution of a metal salt such as aluminum chloride while the dissolution of another salt such as sodium phosphate may be embodied in solution 56 within compartment 38.

Under the influence of the electric current applied to cell 40, cations (illustrated by arrows 58) consisting of the metallic constituents (aluminum) of respective atoms of the metal salt in solution 54 will be caused to migrate toward compartment 38 into porosities 32 and 34 of plate 10. At the same time, anions (illustrated by arrows 60) consisting of the phosphate radicals of the salt in solution 56 will be caused to migrate toward compartment 36 into the same porosities 32 and 34 of plate 10. Upon joining within porosities 32 and 34 electrical charges on cations 58 and anions 60 will be neutralized and interaction of respective constituents of the anions and cations will form precipitate 62 (see FIG. 5) at various points along the length of porosities 32 and 34. Electrodeposition of precipitate 62 is continued until porosities 32 and 34 are substantially completely filled with the precipitate or at least until it is determined that the fiber plae is vacuum tight. In the case where the above given examples of aluminum chloride and sodium phosphate are used as electrolytes in solutions 54 and 56 respectively, the precipitate 62 will be aluminum phosphate.

Other compounds such as barium acetate and sodium sulphate can be used in solutions 54 and 56 respectively to form a suitable similar precipitate 62. Barium acetate and sodium sulphate will precipitate as barium sulphate. In general, any combination of electrolytes in the two compartments can be used provided the ions of one electrolyte do not form a chemical such as an acid in which the precipitate of the other electrolyte is soluble. It is preferable, however, not to select precipitates which will decompose with temperatures below approximately 1100° Fahrenheit since, subsequent to the practice of this invention, processes involving the application of phosphor coatings or other similar energy converting coating materials to the sealed fiber plate might require heating the plate to several hundred degrees Fahrenheit. Also, in making the connection of a sealed fiber plate to an electron tube envelope or the like with glass solder or by direct fusion, the plate might be subjected to temperatures nearly as high as 1100° Fahrenheit.

The present invention also contemplates the formation of glass forming salts such as, for example, borates, phosphates, silicates or combinations thereof as precipitates in porosities 32 and 34. Such a single salt, when vitrified, will form a two component glass having essentially stoichiometric proportions. For example, lead tetraborate, $Pb(B_4O_7)_2$ forms a glass with two moles $B_2O_3$ for each mole of PbO and will vitrify at a temperature between 1000° and 1100° Fahrenheit. Thus, a lead borate glass can be formed in porosities 32 and 34 by placing an aqueous solution 56 of sodium metaborate or sodium tetraborate in the cathode compartment 38 of cell 40 and a solution of lead acetate in the anode compartment 36 of cell 40. Under the influence of the electric potential applied to cell 40 anions consisting of the borate constituents of molecules of either the sodium metaborate or sodium tetraborate, (whichever is selected for use) will be caused to migrate into porosities 32 and 34 of plate 10 under the influence of the electric field in compartment 36. Similarly, and at the same time, cations consisting of the lead constituents of molecules of the lead acetate will be caused to migrate in an opposite direction into the same porosities 32 and 34 of plate 10 under the influence of the electric field of opposite polarity in compartment 38. Upon joining with each other within porosities 32 and 34 at various points along the length thereof, respectively oppositely electrically charged anions and cations will become electrically neutralized and chemically combined to form a lead borate precipitate. Lead tetraborate, for example will be formed when sodium tetraborate is placed in solution 54. The electrolytic action is continued until porosities 32 and 34 in plate 10 are substantially filled with the glass forming salt (lead tetraborate) or until it is determined that an effective hermetic seal has been formed in fiber plate 10.

Fiber plate 10 can be used with the glass forming salt, as such, providing the hermetic seals in porosities 32 and 34 or other such voids in the plate. However, following electro-deposition of the glass forming salt in fiber plate 10, the plate is preferably heated to a temperature of from 1000° to 1100° Fahrenheit to vitrify the salt. At this temperature, the resultant glass seal will wet adjoining surfaces of the materials of the fiber plate and superficially fuse thereto to provide a secure hermetic seal in porosities 32 and 34.

Again, one must avoid a selection of salts in which dissociated constituents of one will form a chemical in which the percipitated compound is soluble.

In another aspect of the present invention, precipitated silicate radicals of silicate solutions such as sodium silicate or potassium silicate can be used to form an insoluble silicate in the porosities 32 and 34 of fiber plate 10. This is accomplished by neutralization of the silicate radicals with metal ions such as barium or aluminum or others. For example, an aqueous solution 56 of potassium silicate may be placed in compartment 38 of cell 40 and an aqueous solution 54 of barium acetate placed in compartment 36. Under the influence of the direct current potential applied to cell 40, silicate ions and barium ions will be caused to migrate toward each other into porosities 32 and 34 in fiber plate 10. Upon meeting within porosities 32 and 34 the silicate and metal (barium) ions will become neutralized and interact to form precipitate 62. Precipitate 62 will, in this case, be an insoluble residue of barium silicate.

In still another aspect of this invention, colloidal silica in aqueous suspension may be placed as negatively charged silica particles in compartment 38 of cell 40 and an aqueous solution of a metal salt such as barium acetate placed in compartment 36. With the direct current potential applied to cell 40 negatively charged silica particles will, under the influence of the positive electric field in compartment 36, be caused to migrate into porosities 32 and 34 in fiber plate 10. Similarly, metal ions of the dissociated metal salt (barium acetate) will be caused to migrate in an opposite direction into the same porosities 32 and 34 to meet the silica particles at various points along the respective lengths of porosities 32 and 34. In so doing, neutralization of electrical charges on respective particles of opposite polarity (the metal ions and silica particles) will cause precipitation thereof in the porosities. In this way, an insoluble plug of silica and metal (barium or aluminum, for example) will provide the hermetic seal in fiber plate 10.

In all aspects of the present invention described hereinabove, a direct current potential of from 100 to 300 volts with solutions 54 and 56 at room temperature will produce desirable results. However, higher voltages can be used to accelerate the electrolytic action. The progress of electrodeposition of precipitate 62 in porosities 32 and 34 can be determined by indication of a change in electric current passing through fiber plate 10 during formation of the particular precipitate. Ammeter 66 in series connected relation with electrode 52, current source 53 and electrode 50 is provided for this purpose.

The electric current passing through fiber plate 10 will, in general, gradually diminish during progress of the depositing action so that when all porosities in the fiber plate are completely sealed with the precipitate being deposited therein, current flow through plate 10 will reach a predetermined minimum or zero level. Ammeter 66 will thus provide an indication of the progress of the depositing action and when registering zero current or nearly so indication will be given that the fiber plate is hermetically sealed and vacuum tight.

Where glass forming salts are electrodeposited in a fiber plate and vitrified as described hereinabove, the inherent dielectric properties of the face plate are not appreciably altered by the seals provided in porosities thereof. The residue resulting from precipitation of the insoluble silicate or silica particles will produce similar results and precipitates in the form of insoluble metal compounds such as the above described aluminum phosphate and barium sulphate will have relatively high dielectric strength.

While examples of the formation of only a few types of precipitates have been given hereinabove for purposes of illustrating the principles of the invention, it should be understood that for, special application, various other compounds or suspension mediums can be used whose constituents when electrolytically dissociated and joined will interact to form a precipitate in the above described manner.

I claim:

1. The method of sealing a porous fiber optic plate which comprises the steps of positioning such plate as a partition between two electrolytic fluid mediums, said mediums being so preselected that certain respective ionic constituents thereof when joined will interact to form a precipitate, providing electric fields of opposite polarity one in each of said mediums to cause said constituents of respective opposing mediums to migrate toward each other into porosities in said fiber plate and precipitate therein and continuing such action until the resultant precipitate is formed in said porosities in sufficient quantity to seal said fiber plate.

2. The method of sealing porosities extending from one face toward the other in a fused fiber optic plate comprising the steps of placing an electrically conductive fluid medium in contact with each face of said plate, said mediums respectively containing ionic constituents which when electrified and joined will interact to form an insoluble precipitate, passing electric current through said mediums and porosities in said plate to influence migration of respective constituents of said mediums toward each other into said porosities and cause interaction and precipitation thereof within said porosities and continuing such action until a sufficient quantity of said insoluble precipitate is formed to seal said porosities in said plate.

3. The method of sealing porosities extending from one face toward the other in a fused fiber optic plate which comprises the steps of positioning such plate as a partition between two fluid mediums each containing an electrolyte in solution, said mediums being in contact with respective opposite faces of said plate, passing electric current through said mediums and porosities in said plate to cause respective dissociated ionic constituents thereof having opposite electrical polarity to migrate toward each other into said porosities, said constituents of opposite polarity being so characterized as to interact upon joining with each other and precipitate in said porosities to form a residue therein and continuing such electrolytic action until a sufficient quantity of said residue is formed to seal said porosities in said plate.

4. The method of sealing a porous fiber optic plate which comprises the steps of positioning such a plate as a partition between two electrolytic fluid mediums each including the dissolution of a salt, said salts being so preselected that respective electrolytically dissociated ionic constituents of opposite electrical polarity thereof when joined will interact to form a precipitate in the form of an insoluble residue, passing an electric current through said fluid mediums and porosities to cause said dissociated constituents of opposite polarity to migrate toward each other and join within said porosities to form said residue and continuing such action until a sufficient quantity of said residue is formed in said porosities to hermetically seal said plate.

5. The method of sealing a porous fiber optic plate which comprises the steps of positioning such a plate as a partition between two electrolytic fluid mediums each including the dissolution of a metal salt, said metal salts being so preselected that respective electrolytically dissociated ionic constituents of opposite electrical polarity thereof when joined will interact to form an insoluble compound, passing an electric current through said fluid mediums and porosities to cause particular dissociated constituents of opposite electrical polarity to migrate toward each other and join within said porosities to form said compound and continuing such action until a sufficient quantity of said compound is formed in said porosities to hermetically seal said plate.

6. The method of sealing a porous fiber optic plate which comprises the steps of positioning such a plate as a partition between two electrolytic fluid mediums each including the dissolution of a salt, said salts being so preselected that electrolytically dissociated ionic constituents of opposite electrical polarity in respective mediums will interact to precipitate as a glass forming salt when caused to join with each other, passing electric current through said fluid mediums and porosities in said plate to cause respective dissociated constituents thereof of opposite electrical polarity to migrate toward each other and join within said porosities to interact and precipitate as said glass forming salt and continuing such action until a sufficient quantity of said glass forming salt is formed in said porosities to seal said plate.

7. The method of sealing a porous fiber optic plate which comprises the steps of positioning such a plate as a partition between two electrolytic fluid mediums each including the dissolution of a salt, said salts being so preselected that electrolytically dissociated ionic constituents of opposite electrical polarity in respective mediums will interact to precipitate as a glass forming salt when caused to join with each other, passing electric current through said fluid mediums and porosities in said plate to cause respective dissociated constituents thereof of opposite electrical polarity to migrate toward each other and join within said porosities to interact and precipitate as said glass forming salt and heating said plate to a temperature sufficient to vitrify said precipitated salt in said porosities to form a glass seal therein.

8. The method of sealing a porous fiber optic plate which comprises the steps of positioning such a plate as a partition between two electrolytic fluid medium, one of said mediums including a silicate solution and the other medium including the dissolution of a metal salt, passing an electric current through said mediums and porosities in said plate to cause ionized silicate radicals of said solution and metal ions of said salt to migrate under the influence of said electric current toward each other into porosities in said plate whereby upon joining with each other in said porosities said silicate radicals and metal ions will interact to precipitate as an insoluble residue and continuing such electrodeposition of said residue until a sufficient quantity thereof is formed in said porosities to seal said plate.

9. The method of sealing a porous fiber optic plate which comprises the steps of positioning such a plate as a partition between two electrolytic fluid mediums, one of said mediums including a suspension of colloidal silica particles and the other medium including the dissolution of a metal salt, passing an electric current through said mediums and porosities in said plate to influence migration of metal ions of said salt and said silica particles one toward the other into porosities in said fiber plate whereby upon joining with each other in said porosities said silica particles and metal ions will interact to precipitate together as an insoluble residue and continuing such electrodeposition of said residue until a sufficient quantity thereof is formed in said porosities to seal said plate.

10. The method of sealing a porous fiber optic plate which comprises the steps of positioning such plate as a partition between two electrolytic fluid mediums placed in an electrolytic cell, each of said mediums containing the dissolution of a salt, said salts being so preselected that when subjected to electrolysis respective anions of one and cations of the other will interact to form an insoluble residue when joined, causing electric current to pass through said mediums and porosities in said fiber plate to cause migration of anions of one salt and cations of the other salt toward and into contact with each other in porosities in said plate to become deposited as said residue therein and continuing such electrodeposition of said residue in said porosities until said plate has become sealed thereby.

11. The method of sealing a porous fiber optic plate comprising placing the solution of two soluble salts in a two part electrolytic cell in which the fiber plate is a partition with said solutions being in contact with respective opposite faces of said plate, said salts being so selected that under the influence of an electric field applied thereto respective ionic constituents thereof will precipitate and form an insoluble residue, providing the cell with an anode in one solution and a cathode in the other solution, applying an electric potential between said anode and cathode to cause respective anions of one salt to migrate toward the anode of said cell into porosities in said fiber plate concurrently with migration of cations of the other salt toward the cathode of the cell and into the same porosities whereby upon contact with each other in said porosities, neutralization of electrical charges on respective contacting anions and cations will cause precipitation thereof and formation of said residue in said porosities and continuing the application of said electric potential until a sufficient quantity of said residue has been formed in said porosities to plug the same and thereby seal said plate.

12. The method of sealing porosities in a fiber optic plate which comprises the steps of positioning such plate as a partition between two compartments of a two part electrolytic cell, placing an electrolytic fluid medium in each compartment of said cell and in contact with respective opposite faces of said plate, said fluid mediums being so preselected that certain respective ionic constituents thereof when electrified and joined will interact to precipitate as an insoluble residue, positioning an electrode in each of said fluid mediums and placing said electrodes in series connected relationship with a source of electric current to provide electric fields of opposite polarity one in each of said fluid mediums and to provide electrical charges of opposite polarity on said certain constituents in respective fluid mediums whereby under the influence of said electric fields of opposite polarity in respective fluid mediums said certain constituents of said mediums will migrate toward each other into porosities of said fiber plate to join therein and precipitate as said residue and continuing such electrodeposition of said residue until a sufficient quantity thereof has been formed in said porosities to seal said fiber plate.

References Cited by the Examiner
UNITED STATES PATENTS

| | | | |
|---|---|---|---|
| 1,291,253 | 1/1919 | Thatcher | 204—295 |
| 1,801,784 | 4/1931 | Schwarz | 204—180 |
| 2,217,334 | 10/1940 | Diggory | 204—15 |

JOHN H. MACK, *Primary Examiner.*

T. TUFARIELLO, *Assistant Examiner.*